United States Patent
Fitzmaurice et al.

(10) Patent No.: US 9,063,925 B2
(45) Date of Patent: Jun. 23, 2015

(54) SYSTEM AND METHOD FOR RECOMMENDING NEXT COMMANDS WHEN USING A SOFTWARE APPLICATION

(75) Inventors: George Fitzmaurice, Toronto (CA); Justin Frank Matejka, Etobicoke (CA)

(73) Assignee: AUTODESK, INC., San Rafael, CA (US)

(*) Notice: Subject to any disclaimer, the term of this patent is extended or adjusted under 35 U.S.C. 154(b) by 1182 days.

(21) Appl. No.: 12/469,509

(22) Filed: May 20, 2009

(65) Prior Publication Data

US 2010/0107141 A1    Apr. 29, 2010

Related U.S. Application Data

(60) Provisional application No. 61/109,140, filed on Oct. 28, 2008.

(51) Int. Cl.
  *G06F 9/44* (2006.01)
  *G06F 17/27* (2006.01)
  *G06F 3/023* (2006.01)

(52) U.S. Cl.
  CPC ............ *G06F 17/276* (2013.01); *G06F 3/0237* (2013.01)

(58) Field of Classification Search
  USPC .................................................. 717/123, 127
  See application file for complete search history.

(56) References Cited

U.S. PATENT DOCUMENTS

| | | | |
|---|---|---|---|
| 4,862,498 A * | 8/1989 | Reed | 379/355.09 |
| 5,742,811 A | 4/1998 | Agrawal et al. | |
| 6,266,060 B1 | 7/2001 | Roth | |
| 6,317,722 B1 * | 11/2001 | Jacobi et al. | 705/14.51 |
| 6,446,192 B1 * | 9/2002 | Narasimhan et al. | 712/29 |
| 6,490,560 B1 | 12/2002 | Ramaswamy et al. | |
| 6,570,588 B1 | 5/2003 | Ando et al. | |
| 6,622,119 B1 | 9/2003 | Ramaswamy et al. | |
| 6,802,052 B1 * | 10/2004 | Andrews | 717/100 |
| 7,194,473 B1 * | 3/2007 | Hichwa et al. | 1/1 |
| 7,747,988 B2 * | 6/2010 | Zhu et al. | 717/131 |
| 2002/0116399 A1 | 8/2002 | Camps et al. | |
| 2003/0046072 A1 | 3/2003 | Ramaswamy et al. | |
| 2003/0105682 A1 | 6/2003 | Dicker et al. | |
| 2004/0117489 A1 * | 6/2004 | Harmon et al. | 709/229 |

(Continued)

OTHER PUBLICATIONS

Office Action for U.S. Appl. No. 12/469,515, dated Aug. 18, 2011.

(Continued)

*Primary Examiner* — Hang Pan
(74) *Attorney, Agent, or Firm* — Artegis Law Group, LLP

(57) ABSTRACT

One embodiment of the invention sets forth a mechanism for recommended commands to a designer of a graphics design application. Each time a command is executed within the graphics design application, a resource module receives command use information associated with the executed command. In response, the resource module generates and transmits one or more recommendation lists to the designer, where each recommendation list includes a list of recommended commands that may be executed by the designer next. The resource module generates the recommendation lists based on frequency information associated with the recommended commands stored within a local frequency store. The frequency information is received by the resource module from a central server that processes command use information associated with different designers in the community to produce the frequency information.

21 Claims, 8 Drawing Sheets

(56) References Cited

U.S. PATENT DOCUMENTS

| | | |
|---|---|---|
| 2004/0128388 A1 | 7/2004 | Kaiser |
| 2005/0039176 A1* | 2/2005 | Fournie .................. 717/156 |
| 2008/0229236 A1* | 9/2008 | Carrer et al. .................. 715/786 |
| 2008/0288433 A1 | 11/2008 | Nores et al. |

OTHER PUBLICATIONS

Final Office Action for U.S. Appl. No. 12/469,515, dated Jan. 31, 2012.

Office Action for U.S. Appl. No. 12/469,515, dated Sep. 13, 2013.

* cited by examiner

SYSTEM AND METHOD FOR RECOMMENDING NEXT COMMANDS WHEN USING A SOFTWARE APPLICATION

CROSS-REFERENCE TO RELATED APPLICATIONS

This application claims the priority benefit of Provisional U.S. Patent Application Ser. No. 61/109,140, filed Oct. 28, 2008, the subject matter of which is hereby incorporated by reference.

BACKGROUND OF THE INVENTION

1. Field of the Invention

The present invention relates generally to the field of computer software and, more specifically, to a system and method for recommending next commands to a user when using a software application.

2. Description of the Related Art

A computer-aided design (CAD) application offers a mechanism for designing and modeling graphics objects within graphics scenes. Each of the graphics objects within a graphics scene is associated with one or more parameters having respective parameter values. For example, a graphics object representing a light source may be associated with a brightness parameter. The CAD application typically provides a large variety of parameter manipulation commands (referred to herein as "CAD commands"). The CAD commands allow users to modify the parameter values of the one or more parameters associated with a graphics object. Some examples of such CAD commands include a rotate command, a zoom command and a brighten command.

When designing a graphics object in a graphics scene, to obtain a particular effect on the graphics object, a user (i.e., the designer) usually performs a series of actions and operations on the graphics object (referred to herein as a "workflow"). The workflow typically includes the execution of one or more CAD commands to modify values of one or more parameters associated with the graphics object. For example, in a "view" workflow, the designer may execute the zoom command and the rotate command to view the graphics object from different angles. For a given workflow, the designer typically executes CAD commands that he/she is familiar with. However, in some cases, the execution of different CAD commands that the designer is not familiar with may be a more effective and powerful approach to obtaining a particular effect on the graphics object.

One major drawback with conventional CAD applications is that they typically do not offer real-time guidance to the designer for navigating the different CAD commands provided by the CAD application. The lack of real-time guidance often times results in the designer being unaware of the different commands offered by the CAD application that would enable the designer to perform a particular workflow more effectively and/or accurately.

As the foregoing illustrates, what is needed in the art is a mechanism for informing a user of a CAD application about the different CAD commands offered by the CAD application that are relevant to different workflows.

SUMMARY OF THE INVENTION

One embodiment of the present invention sets forth a method for processing frequency information in a frequency table stored in a frequency database to determine a set of commands that are recommended for execution next by a first user operating a first instance of an application resident within a first computing device. The method includes the steps of receiving a first set of command use data associated with a first command executed within the first instance of the application, and identifying a first frequency information record stored in the frequency table that includes a first command name associated with the first command and a next command associated with a second command executed within the first instance of the application. The method further includes the steps of computing, based on frequency information included in the first frequency information record, a first frequency percentage associated with the second command indicating how many times the first command was executed within the application prior to when the second command was executed within the application, generating a command recommendation list that includes the second command and the first frequency percentage, transmitting the command recommendation list to the first instance of the application for display to the first user.

One advantage of the disclosed method is that the first user is informed of different recommended commands in real-time via the recommendation lists generated by an application. Another advantage is that the central server distributes processed and relevant frequency information to each instance of the application executing within a network, thereby reducing the quantity of frequency information that needs to be processed by the different endpoint machines in the network.

BRIEF DESCRIPTION OF THE DRAWINGS

So that the manner in which the above recited features of the present invention can be understood in detail, a more particular description of the present invention, briefly summarized above, may be had by reference to embodiments, some of which are illustrated in the appended drawings. It is to be noted, however, that the appended drawings illustrate only typical embodiments of this present invention and are therefore not to be considered limiting of its scope, for the present invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
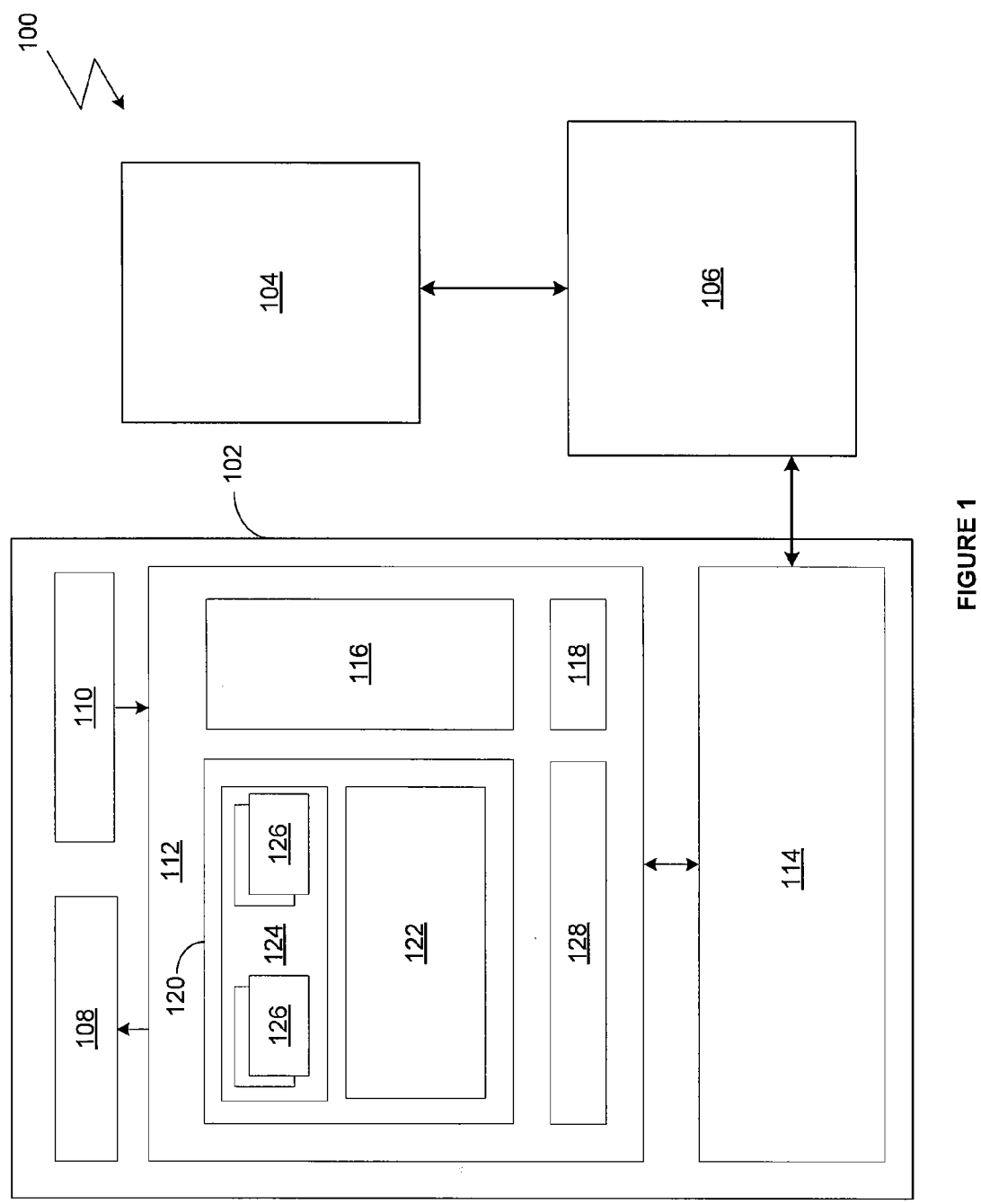
FIG. 1 is a block diagram of a network configured to implement one or more aspects of the present invention.

FIG. 1 is a block diagram of a network 100 configured to implement one or more aspects of the present invention. As shown, the network 100, without limitation, includes computing devices 102 and 104 and a central server 106.

The network 100 may be a local area network or a larger, wide area network, such as the Internet. The network 100 may include several computing devices, such as the computing device 102 and the computing device 104. The computing devices within the network 100 communicate with the central server 106 via a network protocol. Each individual computing device within the network 100 may be operated by one or more users, where all such users network-wide form a network community (referred to herein as the "community.") The computing devices within the network 100 may include similar components and function in a similar fashion. For purposes of example only, the components and the functionality of computing device 102 are described in greater detail below.

As shown, the computing device 102 includes a display device 108, a user input device 110, a computer-aided design (CAD) application 112 and a resource module 114. The display device 108 may be a cathode-ray tube (CRT), a liquid crystal display (LCD) or any other type of display device for displaying rendered output to a user of the computing device 102. Input is received from the user via the user input device 110, which may be a mouse pointing device, a keyboard, a joystick, a video game controller, or any other type of user input device.

The CAD application 112 executing within the computing device 102 is a software application that allows the user (i.e., the designer) to design and model graphics objects within graphics scenes. The CAD application 112 includes a three-dimensional (3D) graphics model 116, a user context 118, graphical user-interface (GUI) 120 and a resource interface 128. The 3D graphics model 116 is a user-defined graphics model that may include one or more graphics objects. Each graphics object in the 3D graphics model 116 is associated with configurable attributes that define the physical and/or display characteristics of the graphics object. For example, the 3D graphics model 116 may be a model of a building where the graphics objects within the 3D graphics model 116 may include wall graphics objects, window graphics objects and lighting graphics objects. The window graphics objects may be associated with a height configurable attribute and the lighting graphics objects may be associated with a brightness configurable attribute.

When designing the 3D graphics model 116, the designer may modify the different configurable parameters associated with the graphics objects within the 3D graphics model 116 in a particular workflow. A design context can reflect a particular workflow performed by the designer when interacting with the CAD application 112 to obtain a specific effect on the 3D graphics model 116. For example, the designer may modify the size configurable parameter associated with a window graphics object and the brightness configurable parameter associated with a lighting graphics object to obtain a particular lighting effect on the 3D graphics model 116. The design context can also reflect specific properties of the 3D graphics model 116, such as the number of vertices and/or the number of faces. In one embodiment, the design context may be manually specified by the designer when initiating a workflow. In a different embodiment, the CAD application 112 infers the design context associated with the work flow based on the CAD commands that are executed by the designer. The user context 118 stores the design context associated with the workflow that is being executed by the designer.

The GUI 120 generates a 3D model view 122 and a tools menu 124, and transmits the generated 3D model view 122 and the generated tools menu 124 to the display device 108 for display. The 3D model view 122 is a rendered view of the 3D graphics model 116 displayed on the display device 108. The tools menu 124 includes one or more user-interface (UI) elements 126. Each UI element 126 corresponds to a specific CAD command. The designer may manipulate a specific UI element 126, via the user input device 110, to execute the CAD command corresponding to the specific UI element 126. The execution of a particular CAD command causes the modification of a specific configurable attribute associated with a graphics object within the 3D graphics model 116. Again, the configurable attributes associated with the graphics object define the physical and/or display characteristics of the graphics object.

In a particular workflow, each time the designer manipulates a UI element 126 to execute the corresponding CAD command, a notification is transmitted from the GUI 120 to the resource interface 128. The transmitted notification includes a unique user identification associated with the designer and a unique session identification associated with a currently active session of the CAD application 112. The notification also includes a command name identifying the executed CAD command, a timestamp specifying the time at which the designer manipulated the specific UI element 126 corresponding to the executed CAD command, and the design context stored in the user context 118. The resource interface 128 then transmits the notification received from the GUI 120 to the resource module 114.

Upon receiving a notification from the resource interface 128, the resource module 114 performs several actions. First, the resource module 114 transmits a user recommendation list and one or more community recommendation lists to the CAD application 112 for display. The user recommendation list includes a list of recommended CAD commands that have previously been executed by the designer after executing the CAD command identified by the notification. Similarly, each community recommendation list includes a list of recommended CAD commands that have previously been executed by a specific designer or a group of designers in the community after executing the CAD command identified by the notification. The CAD application displays the user recommendation list and the community recommendation lists received from the resource module within the GUI 120. The designer may then select a CAD command from the user recommendation list or the community recommendation lists for execution within the workflow.

Second, the resource module 114 extracts and stores the information included in the notification (referred to herein as "command use information"). The resource module 114 processes the received command use information to generate frequency information associated with CAD commands executed by the designer. Frequency information associated with a given CAD command indicates the number of times the execution of the given CAD command is preceded by the execution of another specific CAD command by a particular designer in a given design context.

Third, the resource module 114 transmits the command use information to the central server 106 for further processing. In addition, the resource module 114 receives frequency information associated with different CAD commands executed by other designers in the community from the central server 106.

Figure 2:
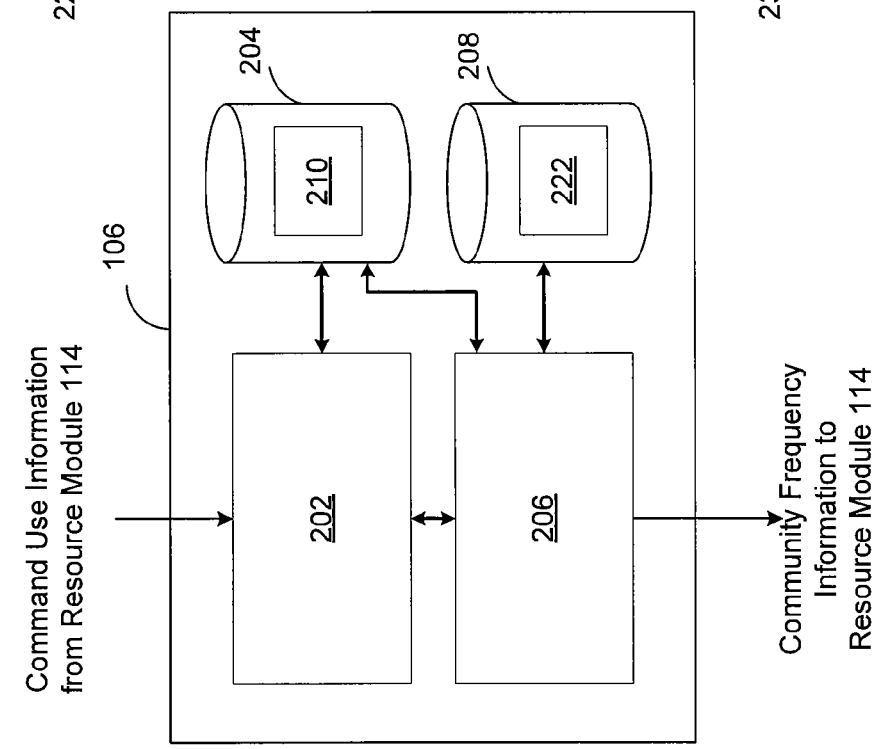
FIG. 2A is a more detailed diagram of the central server of FIG. 1, according to one embodiment of the present invention.
FIG. 2B is a conceptual diagram illustrating the different portions in the command table for storing command use information, according to one embodiment of the present invention.
FIG. 2C is a conceptual diagram illustrating a community-frequency table in the community-frequency store of FIG. 2A for storing frequency information, according to one embodiment of the present invention.

As described in greater detail below in conjunction with FIGS. 2A-2C, the central server 106 receives command use information associated with the execution of different CAD commands from the resource module 114 within the computing device 102. The central server 106 stores and processes the command use information and, at pre-determined intervals, transmits frequency information generated based on the command use information to the resource module 114 within the computing device 102.

FIG. 2A is a more detailed diagram of the central server 106 of FIG. 1, according to one embodiment of the present invention. As shown, the central server 106 includes a data storage engine 202, a command data store 204, a community-frequency engine 206 and a community-frequency store 208.

As previously described in conjunction with FIG. 1, each time a CAD command is executed within the CAD application 112, command use information is transmitted to the resource module 114. The resource module 114 then transmits the command use information to the data storage engine 202 within the central server 106. The data storage engine 202 stores the received command use information in a command table 210 within the command data store 204. The command data store 204 can be any conventional means of storing and organizing data, such as a database. When storing command use information, the data storage engine 202 creates a new record in the command table 210. Different portions of the command use information are then stored in different portions within the new record.

FIG. 2B is a conceptual diagram illustrating the different portions in the command table 210 for storing command use information, according to one embodiment of the present invention. A record in the command table 210 includes a user identification portion 212, a session identification portion 214, a command name portion 216, a timestamp portion 218 and a design context portion 220. Each record in the command table 210 stores command use information associated with the execution of a particular CAD command by a designer within the community in a given design context and a specific session. For a particular record within the command table 210, such as record 221, the command name portion 216 stores the command name of the executed CAD command and the user identification portion 212 stores the unique user identification identifying the designer that executed the CAD command. Similarly, the design context portion 220 in the particular record stores the design context associated with the executed CAD command.

The data storage engine 202 also receives command use information from other computing devices within the network 100, such as computing device 104, each time a CAD command is executed within the other computing devices. Command use information received from other computing devices within the network 100 is processed and stored within the command table 210 in a similar fashion as discussed above.

At regular intervals, the community-frequency engine 206 processes the command use information stored within the command table 210 to produce frequency information associated with different CAD commands executed by the designers within the community. The community-frequency engine 206 stores the produced frequency information in a community-frequency table 222 within the community-frequency store 208. The community-frequency engine 206 can be any conventional means of storing and organizing data, such as a database.

FIG. 2C is a conceptual diagram illustrating the community-frequency table 222 in the community-frequency store 208 of FIG. 2A for storing frequency information, according to one embodiment of the present invention. A community-frequency record in the community-frequency table 222 includes a user identification portion 224, a command name portion 226, a previous command portion 228, a frequency portion 230 and a design context 232 portion. Each community-frequency record in the community-frequency table 222, such as community-frequency record 234, stores frequency information associated with a given CAD command executed by a specific designer in a given design context. Frequency information associated with a given CAD command indicates the number of times a specific designer executed the given CAD command after executing a particular CAD command in a specific context.

To produce frequency information for the records stored in the command table 210, the community-frequency engine 206 first determines a set of related records in the command table 210. The set of related records corresponds to a set of CAD commands executed by a specific designer within a particular session and a specific design context. For each record in the set of related records, the information stored in the user identification portion 212, the session identification portion 214 and the design context portion 220 is the same.

Based on the determined set of related records, the community-frequency engine 206 next determines a command execution sequence by sorting the records in the set of records according to the timestamp portions 218. The command execution sequence indicates the sequence in which the CAD commands were executed within the particular session by the specific designer. For each CAD command in the command execution sequence, the community-frequency engine 206 then updates frequency information associated with the CAD command within the community-frequency store 208.

To update frequency information associated with a particular CAD command in the command execution sequence, the community-frequency engine 206 first determines whether a community-frequency record associated with the CAD command already exists in the community-frequency table 222. A community-frequency record in the community-frequency table 222 is associated with the CAD command if the command name portion 226 matches the command name identifying the CAD command, and the user identification portion 224 and the design context portion 232 match the user identification and the design context associated with the set of related records, respectively. Further, the previous command portion 228 of a community-frequency record associated with the CAD command matches the command name identifying the command executed before the CAD command in the command execution sequence. Again, the command execution sequence indicates the sequence in which the CAD commands corresponding to the set of related records were executed within the particular session by the specific designer.

If a community-frequency record associated with the CAD command exists within the community-frequency table 222, then the community-frequency engine 206 increments the numerical frequency stored in the frequency portion 230 of the associated community-frequency record. However, if an associated community-frequency record does not exist, then the community-frequency engine 206 creates a new community-frequency record in the community-frequency table 222 that is associated with the CAD command. The command name command name identifying the CAD command is stored in the command name portion 226 of the new community-frequency record, and the user identification and the design context associated with the set of related records are stored in the user identification portion 224 and the design context portion 232, respectively. Further, the command name identifying the command executed before the CAD command in the command execution sequence is stored in the previous command portion 228 of the new community-frequency record. The numerical frequency stored in the frequency portion 230 of the new community-frequency record is incremented to one.

The community-frequency engine 206 also transmits frequency information stored within the community-frequency engine 206 associated with CAD commands executed by different designers within the community to the resource module 114. The community-frequency engine 206 determines what information should be transmitted to the resource module 114 based on pre-configured preferences associated with the designer operating the CAD application 112. The pre-configured preferences associated with the designer indicate other designers or groups of designers in the community whose frequency information is of interest to the designer. For example, in some cases, only frequency information stored in community-frequency records within the community-frequency table 222 associated with a group of users selected by the designer is transmitted to the resource module 114. As previously described in conjunction with FIG. 1, the resource module 114 generates one or more community recommendation lists for display within the CAD application 112 based on the frequency information received from the community-frequency engine 206.

Figure 3:
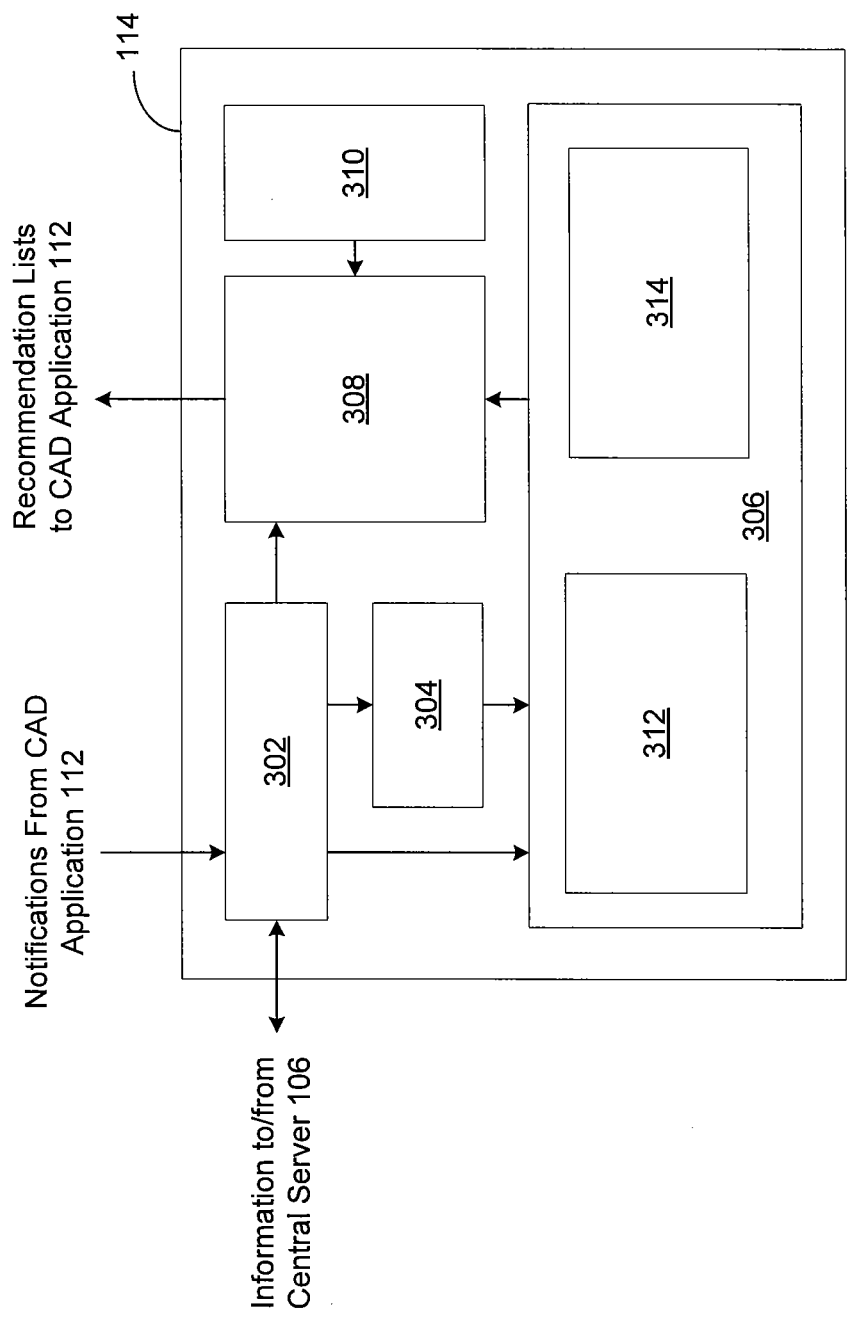
FIG. 3 is a more detailed diagram of the resource module of FIG. 1, according to one embodiment of the present invention.

FIG. 3 is a more detailed diagram of the resource module 114 of FIG. 1, according to one embodiment of the present invention. As previously described, the resource module 114 receives command use information from the CAD application 112 each time a CAD command is executed by the designer operating the CAD application 112. In response, the resource module 114 transmits a user recommendation list and one or more community recommendation lists to the CAD application for display to the designer. As shown, the resource module 114 includes a data engine 302, a user frequency engine 304, a frequency information store 306, a recommendation engine 308 and configurable meta-data 310.

The data engine 302 receives frequency information associated with CAD commands executed by different designers within the community from the central server 106 at regular intervals. The received frequency information is transmitted to the frequency store 306 for storage within a local community-frequency table 312. The structure of the local community-frequency table 312 is similar to the structure of the community-frequency table 222 described above in conjunction with FIG. 2C.

The data engine 302 also receives command use information from the resource interface 128 each time a CAD command is executed by the designer within the CAD application 112. Again, the command use information includes information such as the command name of the executed CAD command, the unique user identification identifying the designer who executed the CAD command and the design context associated with the executed CAD command. The data engine 302 transmits the command use information to the central server 106, which processes the command use information to generate frequency information, as described in conjunction with FIGS. 2A-2C. The data engine 302 also transmits the command use information to the user frequency engine 304 and the recommendation engine 308 within the resource module 114 for further processing.

Based on the command use information received from the data engine 302, the user frequency engine 304 updates frequency information associated with the executed CAD command in a local user-frequency table 314 within the frequency information store 306. The structure of the local user-frequency table 314 is similar to the structure of the community-frequency table 222 described above in conjunction with FIG. 2C. Each user-frequency record in the local user-frequency table 314 stores frequency information associated with a given CAD command executed by the designer operating the CAD application 112 in a given design context. The user frequency engine 304 updates the local user-frequency table 314 in a similar fashion as the community-frequency engine 306 updates the community-frequency table 222, as described above in conjunction with FIG. 2A-2C.

In response to the command use information received from the data engine 302, the recommendation engine 308 generates a user recommendation list that is transmitted to the resource interface 128 within the CAD application 112. To generate the user recommendation list, the recommendation engine 308 searches the local user-frequency table 314 to determine a set of user-frequency records where the previous command portion of each of the user-frequency records matches the command name included in the command use information. Each user-frequency record in such a set of user-frequency records corresponds to a different CAD command that was previously executed by the designer after a previous execution of the CAD command identified by the command name included in the command use information. In a different embodiment, the set of user-frequency records is determined based on the previous command portions of the user-frequency records matching the command name included in the command use information and the design context portions of the user-frequency records matching the design context included in the command use information. In such a case, the set of user-frequency records corresponds to CAD commands that were previously executed by the designer in a particular design context that matches the current design context.

Once the set of user-frequency records is determined, the recommendation engine 308 computes a frequency percentage associated with each of the different CAD commands corresponding to the set of user-frequency records A frequency percentage associated with a specific CAD command reflects a percentage of the number of times the designer executed the specific CAD command in comparison to the execution of all CAD commands corresponding to the set of records. To compute a frequency percentage associated with a particular CAD command corresponding to a specific user-frequency record, the recommendation engine first computes the sum of the numerical frequencies stored in the frequency portions of the user-frequency records in the set of user-frequency records. The frequency percentage associated with the particular CAD command is then computed using the following formula:

$$FP_{PR} = \frac{F_{PR}}{\sum F_R}$$

where $FP_{SR}$ is the frequency percentage associated with the particular user-frequency record, $F_{SR}$ is the numerical frequency stored in the frequency portion of the particular user-frequency record and $\Sigma F_R$ is the sum of the numerical frequencies in the frequency portions of the user-frequency records in the set of user-frequency records.

The recommendation engine 308 then generates the user recommendation list based on the determined set of user-frequency records and the associated frequency percentages. The user recommendation list includes a set of recommended CAD commands corresponding to the different CAD commands associated with the set of user-frequency records. The recommendation engine 308 then orders the set of recommended CAD commands in the user recommendation list based on the frequency percentages associated with the different CAD commands. The generated user recommendation list is transmitted to the GUI 120 within the CAD application 112, via the resource interface 128. The user recommendation list is displayed in a user recommendation list view within the GUI 120 from which the designer may select a recommended CAD command for execution.

In one embodiment, the number of recommended CAD commands that are included in the list is determined based on a configurable attribute stored within the configurable metadata 310. The configurable attribute stored within the configurable metadata 310 may be configured by the designer or may be pre-determined by the resource module 114.

Also in response to the command use information received from the data engine 302, the recommendation engine 308 generates one or more community recommendation lists that are transmitted to the resource interface 128 within the CAD application 112. To generate the one or more community recommendation list, the recommendation engine 308 first determines other designers or groups of designers that are related to the designer operating the CAD application 112. In one embodiment, the designer operating the CAD application 112 can pre-configure the configurable metadata 310 to store the set of related designers or groups of designers. In another embodiment, the recommendation engine 308 may determine the related designers or groups of designers based on CAD command use patterns of the designer and/or the design context included in the command use information.

For each related designer, the recommendation engine 308 searches the local community-frequency table 312, that is populated based on frequency information received from the central server 106, to determine a set of community-frequency records associated with the related designer. The previous command portion of each community-frequency record in the set of community-frequency records matches the command name included in the command use information and the user identification portion matches the user identification associated with the related designer. Once such a set of community-frequency records is determined, the recommendation engine 308 computes frequency percentages associated with the different CAD commands corresponding to the set of community-frequency records. The community recommendation list associated with the related designer is then generated by the recommendation engine 308 based on the determined set of community-frequency records and the frequency percentages associated with the different CAD commands.

Similarly, for each related group of designers the recommendation engine 308 searches the local community-frequency table 212 to determine a set of community-frequency records associated with the related group of designers. The previous command portion of each community-frequency record in the set of community-frequency records matches the command name included in the command use information and the user identification portion matches the user identification associated with a specific designer in the related group of designers. Once such a set of community-frequency records is determined, the recommendation engine 308 computes frequency percentages associated with the different CAD commands corresponding to the set of community-frequency records. The community recommendation list associated with the related group of designers is then generated by the recommendation engine 308 based on the determined set of community-frequency records and the frequency percentages associated with the different CAD commands.

The recommendation engine 308 transmits the generated community recommendation lists to the GUI 120 within the CAD application 112, via the resource interface 128, for display. The designer may then select a recommended CAD command from a community recommendation list for execution.

Figure 4B:
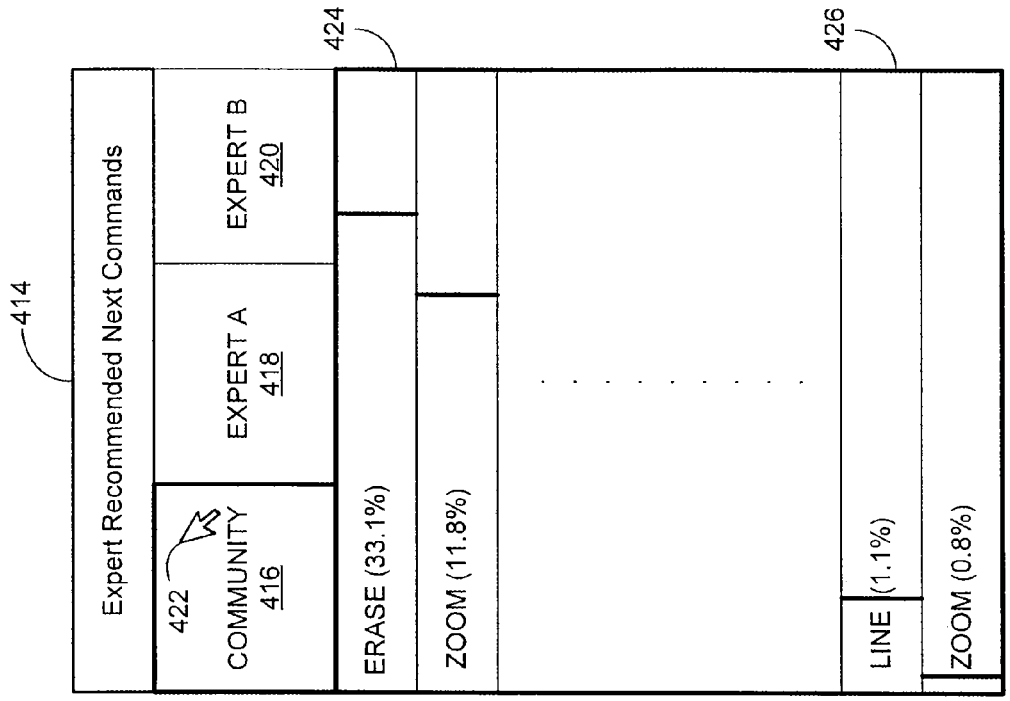
FIG. 4B is a conceptual diagram of a community recommendation list view displayed in the 120 of FIG. 1, according to one embodiment of the present invention.
Figure 4A:
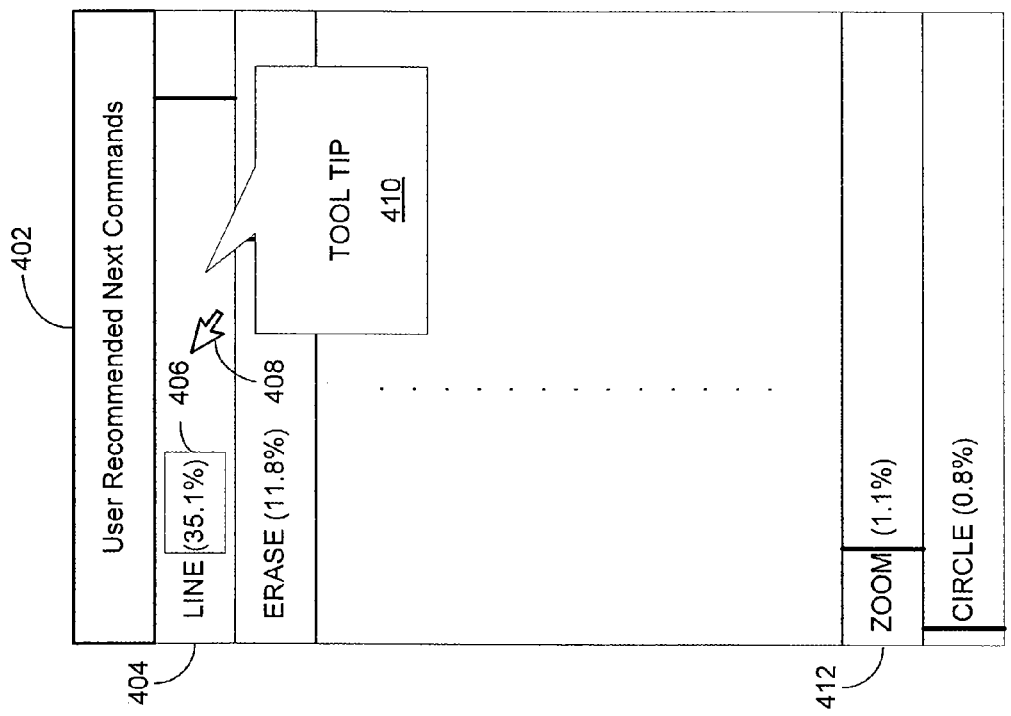
FIG. 4A is a conceptual diagram of a user recommendation list view displayed in the GUI of FIG. 1, according to one embodiment of the present invention.

FIG. 4A is a conceptual diagram of a user recommendation list view 402 displayed in the GUI 120 of FIG. 1, according to one embodiment of the present invention. As shown, the user recommendation list view 402 includes a list of recommended CAD commands, such as CAD command 404 and CAD command 412.

As previously described, a user recommendation list, generated by the resource module 114, is displayed in a user recommendation list view, such as the user recommendation list view 402. Each of the CAD commands displayed in the user recommendation list view 402 reflects a recommended CAD command that has previously been executed by the designer after executing the currently executed CAD command in a different session. Each of the displayed CAD commands also includes an associated frequency percentage, such as frequency percentage 406 associated with the CAD command 404. The frequency percentage 406 indicates the frequency with which the designer executed CAD command 404 after the currently executed CAD command.

The designer may select a particular CAD command in the user recommendation list 402 by dragging the mouse cursor 408 using the input device 110 to the particular CAD command. For example, the designer may drag the mouse cursor 408 to CAD command 404 for selection. In addition, when the designer drags the mouse cursor 408 to CAD command 404, a tool tip dialogue 410 is generated by the CAD application 112 for display within the GUI 120. The tool tip dialogue 410 includes information regarding the selected CAD command 404, such as a description of the function of the CAD command 404, i.e., drawing a line graphics object within the 3D model 116.

FIG. 4B is a conceptual diagram of a community recommendation list view 414 displayed in the GUI 120 of FIG. 1, according to one embodiment of the present invention. As shown, the community recommendation list view 404 includes three tabs, a community tab 416, a first expert tab 418, and a second expert tab 420.

Each of the three tabs within the community recommendation list view 414 is associated with a different community recommendation list received from the resource module 114. As previously described, a community recommendation list is associated with a specific designer or a group of designers within the community. Each community recommendation list includes a list of recommended CAD commands that have been previously executed by the specific designer or the group of designers after executing the currently executed CAD command.

The designer may select a particular tab, such as the community tab 416, by dragging the mouse cursor 422 to the particular tab. For example, if the user selects the community tab 416, the community recommendation list associated with the entire community, received from the resource module 114, is displayed within the community recommendation list view 414. As with the user recommendation list 402 in FIG. 4A, the designer may select a particular CAD command from the community recommendation list, such as CAD command 424 or CAD command 426, for execution.

Figure 5A:
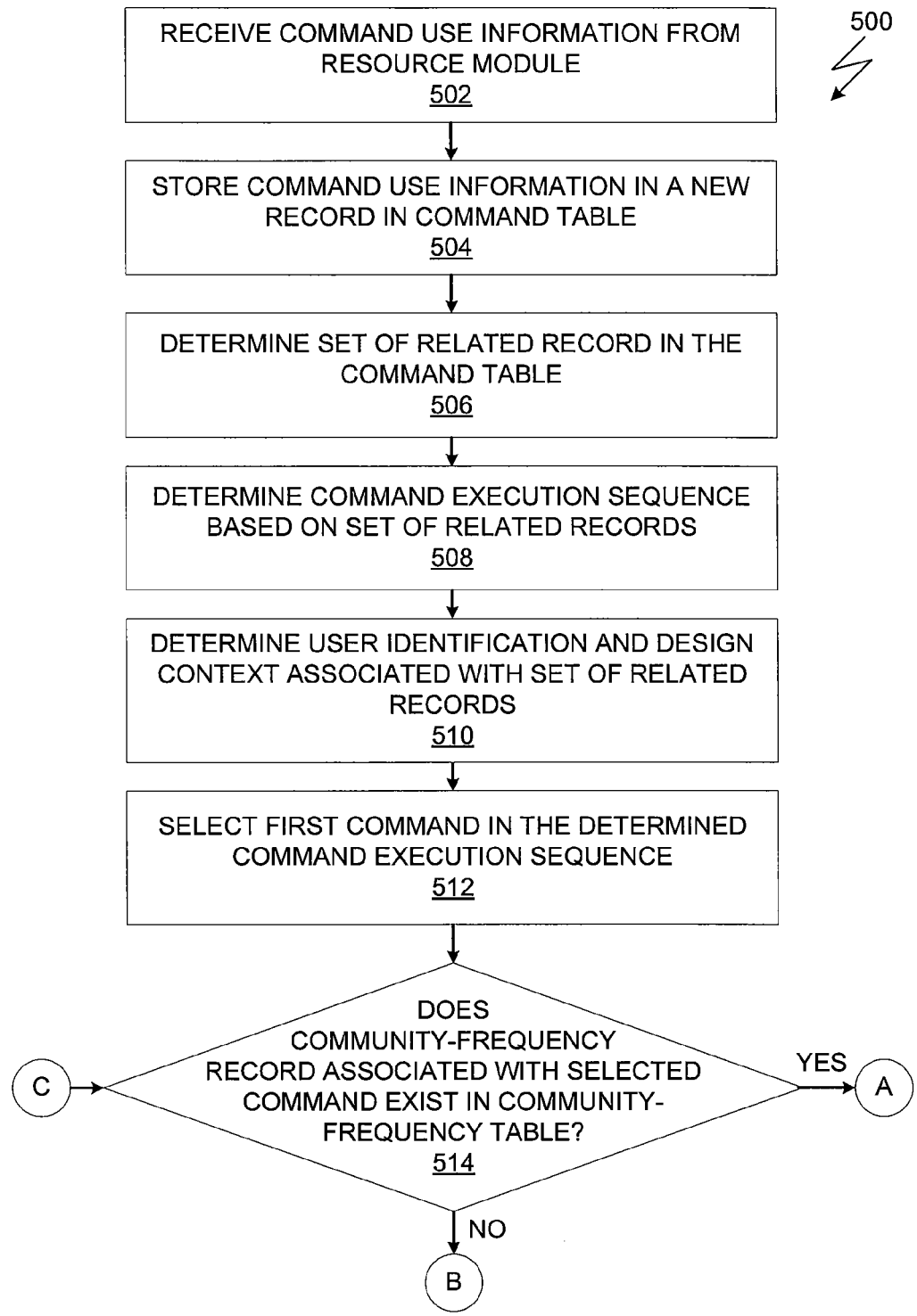
FIGS. 5A and 5B set forth a flow diagram of method steps for processing command use information received from the resource module of FIG. 1 to generate frequency information, according to one embodiment of the present invention.
Figure 5B:
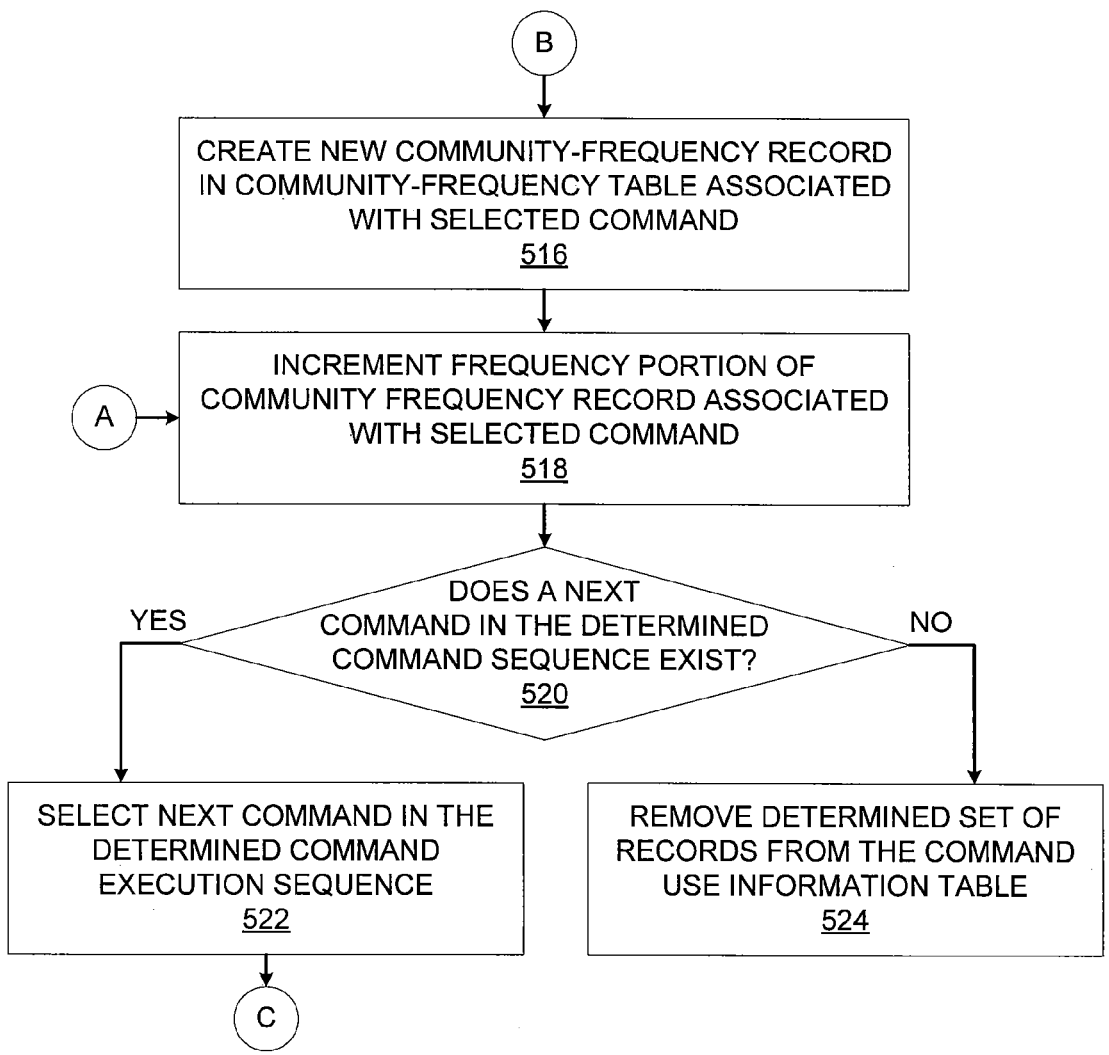

FIGS. 5A and 5B set forth a flow diagram of method steps for processing command use information received from the resource module 114 of FIG. 1 to generate frequency information, according to one embodiment of the present invention. Although the method steps are described in conjunction with the systems for FIGS. 1-4B, persons skilled in the art will understand that any system configured to perform the method steps, in any order, is within the scope of the invention.

The method 500 begins at step 502, where the data storage engine 202 within the central server 106 receives command use information from the resource module 114 when a CAD command is executed within the CAD application 112. As described in conjunction with FIG. 1, command use information associated with an executed CAD command includes a unique user identification associated with the designer who executed the CAD command and a unique session identification associated with a currently active session of the CAD application 112. The command use information also includes a command name associated with the executed CAD command, a timestamp specifying the time at which the CAD command was executed, and a design context associated with the session on the CAD application 112 in which the CAD command was executed.

At step 504, the data storage engine 202 stores the received command use information in the command table 210 within the command data store 204. When storing command use information, the data storage engine 202 creates a new record in the command table 210, and different portions of the received command use information are then stored in different portions within the new record. For example, the command name of the executed CAD command is stored in the command name portion 216 of the new record, and the unique user identification identifying the designer that executed the CAD command is stored in the user identification portion 212 of the new record.

At step 506, the community-frequency engine 206 searches the command use information stored within different records in the command table 210 to a set of related records in the command table 210. The set of related records corresponds to a set of CAD commands executed by a specific designer within a particular session and a specific design context. As previously described, for each record in the set of related records, the information stored in the user identification portion 212, the session identification portion 214 and the design context portion 220 is the same.

At step 508, the community-frequency engine 206 determines a command execution sequence by sorting the records in the set of related records according to the timestamp portions 218 of the records. The command execution sequence indicates the sequence in which the CAD commands were executed within the particular session by the specific designer.

Once the command execution sequence is determined, the community-frequency engine 206 stores frequency information associated with each record in the set of related records in the community-frequency table 222. At step 510, the community-frequency engine 206 determines the user identification and the design context associated with the set of related records. The associated user identification is retrieved from the user identification portions 212 of the records in the set of related records and identifies the designer that executed the CAD commands in the command execution sequence associated with the set of related records. The associated design context is retrieved from the design context portion 220 of the given record and identifies the design context associated with the executed CAD commands.

At step 512, the community-frequency engine 206 selects the first CAD command in the command execution sequence. Then, at step 514, the community-frequency engine 206 determines whether a community-frequency record associated with the selected CAD command exists in the community-frequency table 222. A community-frequency record in the community-frequency table 222 is associated with the selected CAD command if the command name portion 226 matches the command name identifying the selected CAD command, and the user identification portion 224 and the design context portion 232 match the user identification and the design context associated with the set of related records, respectively. Further, the previous command portion 228 of a community-frequency record associated with the selected CAD command indicates the CAD command previous to the selected CAD command in the command execution sequence. In the case where the first CAD command in the command execution sequence is selected, the previous command portion 228 of the associated community-frequency record is empty.

If, at step 514, a community-frequency record associated with the selected CAD command does not exist, then the method 500 proceeds to step 516. At step 516, the community-frequency engine 206 creates a new community-frequency record in the community-frequency table 222 that is associated with the selected CAD command. The method 500 proceeds to step 518. However if, at step 514, a community-frequency record associated with the selected CAD command exists in the community-frequency table 222, then the method 500 proceeds directly to step 518.

At step 518, the community-frequency engine 206 increments the numerical frequency stored in the frequency portion 230 of the associated community-frequency record. At step 520, the community-frequency engine 206 determines whether a next command in the command execution sequence, determined at step 508, exists. If so, then the method 500 proceeds to step 522, where the community-frequency engine 206 selects the next command in the determined command execution sequence. The method 500 then returns to step 514.

The method 500 continues to loop in this fashion, between steps 514-522, until frequency information associated with all the commands in the command execution sequence is updated within the community-frequency table 522. Accordingly, if at step 520, a next command in the determined command execution sequence does not exist, the method proceeds to step 524, where the community-frequency engine 206 removes each record in the set of related records from the command table 210.

Figure 6A:
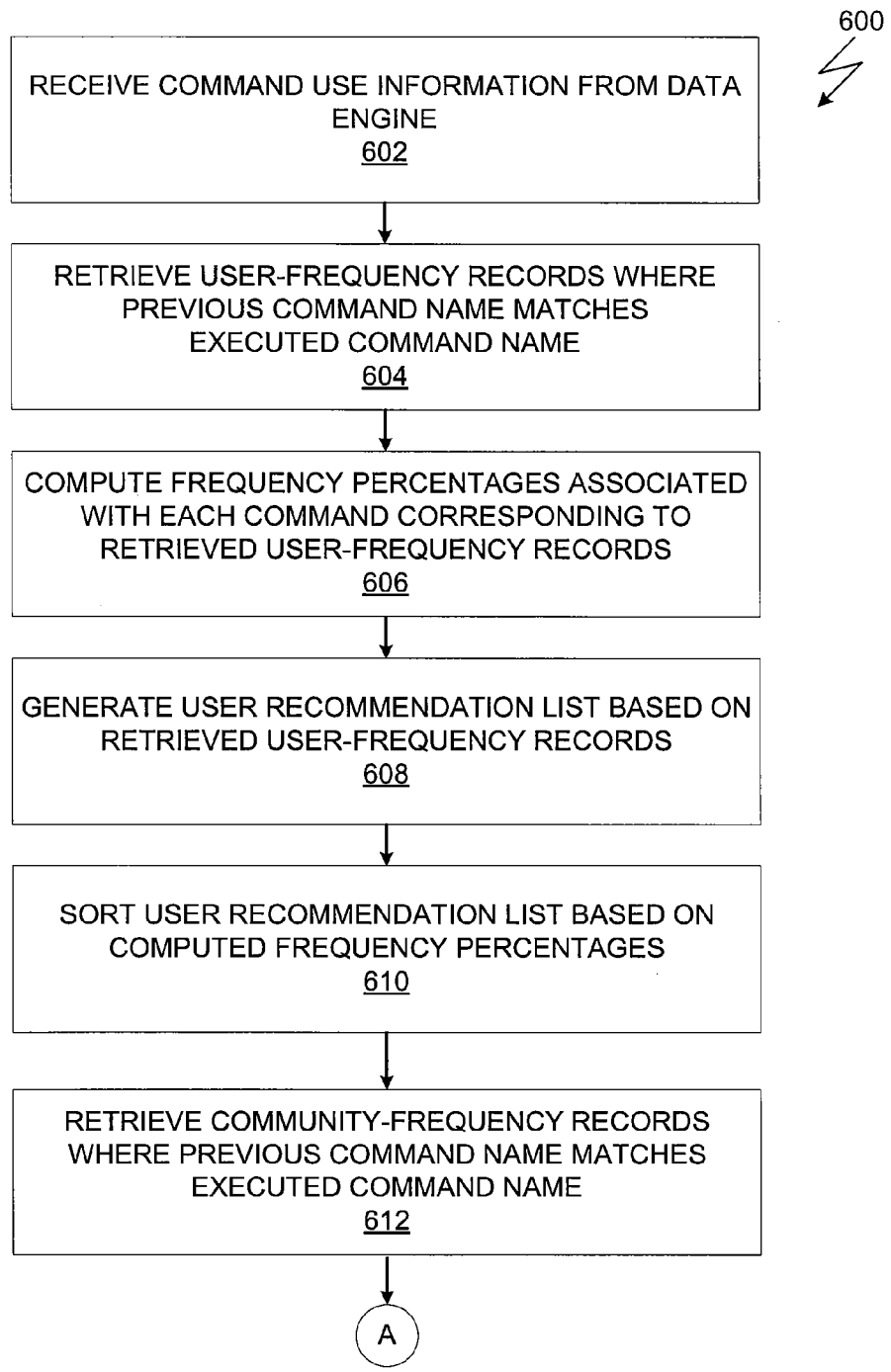
FIGS. 6A and 6B set forth a flow diagram of method steps for generating a user recommendation list and a community recommendation list from the user-frequency table and the community-frequency table, according to one embodiment of the present invention.
Figure 6B:
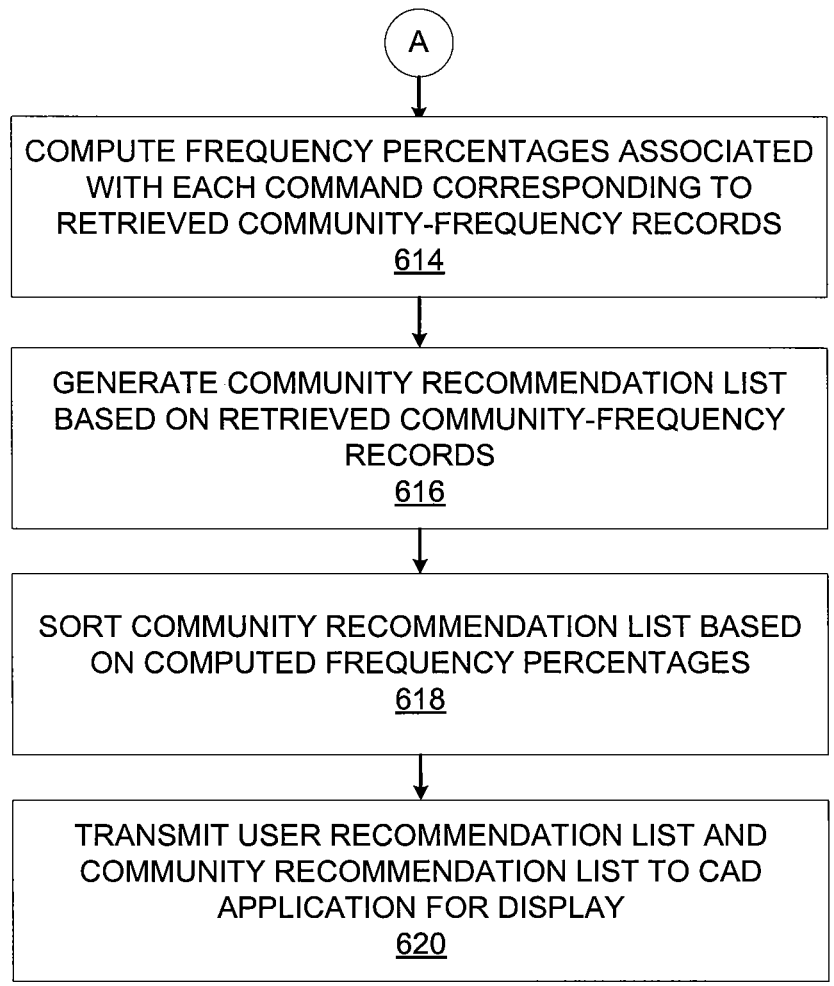

FIGS. 6A and 6B set forth a flow diagram of method steps for generating a user recommendation list and a community recommendation list from the local user-frequency table 314 and the local community-frequency table 316, according to one embodiment of the present invention. Although the method steps are described in conjunction with the systems for FIGS. 1-4B, persons skilled in the art will understand that any system configured to perform the method steps, in any order, is within the scope of the invention.

The method 600 begins at step 602, where the recommendation engine 308 receives command use information from the data engine 302. As described in conjunction with FIG. 3, the data engine 302 receives command use information from the CAD application 112 each time a CAD command is executed within the CAD application 112. The data engine 302 transmits the command use information to the recommendation engine 308 for processing.

At step 604, in response to receiving the command use information, the recommendation engine 308 retrieves user-frequency records from the local user-frequency table 314 where the previous command portion of each of the user-frequency records matches the command name included in the command use information. Each user-frequency record in such a set of user-frequency records corresponds to a different CAD command that was previously executed by the designer after a previous execution of the CAD command identified by the command use information.

At step 606, the recommendation engine 308 computes a frequency percentage associated with each of the different CAD commands corresponding to the set of user-frequency records. A frequency percentage associated with a specific CAD command reflects a percentage of the number of times the designer executed the specific CAD command in comparison to the execution of all CAD commands corresponding to the set of records. The specific formula used by the recommendation engine 308 has been previously described in conjunction with FIG. 3.

At step 608, the recommendation engine 308 generates a user recommendation list that includes each of the different CAD commands corresponding to the set of user-frequency records. At step 610, the recommendation engine 308 sorts the user recommendation list based on the frequency percentages associated with each of the different CAD commands that are included in the user recommendation list.

At step 612, also in response to receiving the command use information, the recommendation engine 308 retrieves community-frequency records from the local community-frequency table 312 where the previous command portion of each of the records matches the command name included in the command use information. Each record in such a set of community-frequency records corresponds to a different CAD command that was previously executed by a specific designer or a group of designers within the community after a previous execution of the CAD command identified by the command name included in the command use information.

At step 614, the recommendation engine 308 computes a frequency percentage associated with each of the different CAD commands corresponding to the set of community-frequency records. At step 616, the recommendation engine 308 generates a community recommendation list that includes each of the different CAD commands corresponding to the set of community-frequency records. At step 618, the recommendation engine 308 sorts the community recommendation list based on the frequency percentages associated with each of the different CAD commands that are included in the community recommendation list.

At step 620, the recommendation engine transmits the user recommendation list generated at step 608 and the community recommendation list generated at step 616 to the GUI 122 in the CAD application 112, via the resource interface 128. The user recommendation list and the community recommendation list is displayed to the designer who may select a particular CAD command from the user recommendation list or the community recommendation list for execution next.

In sum, the disclosed network includes a central server communicating with several different computing devices that are operated by different users who form a community within the network. Each such computing device includes a computer-aided design (CAD) application and a resource module. A user (i.e. the designer) operating the CAD application executes different CAD commands, via a graphical user-interface (GUI), offered by the CAD application when designing and/or modifying a graphics scene, 2D model or a 3D model. Each time the designer executes a particular CAD command, the CAD application transmits command use information associated with the currently executed CAD command to the resource module. The command use information includes information such as a user identification identifying the designer, a session identification identifying the currently active session and a command name identifying the currently executed CAD command. Upon receiving the command use information from the CAD application, the resource module performs several actions.

First, the resource module generates a user recommendation list and one or more community recommendation lists. To generate the user recommendation list, a recommendation engine within the resource module searches a local user-frequency table to determine a set of recommended CAD commands that have been previously executed by the designer after previously executing the particular CAD command. The generated user recommendation list is transmitted to the CAD application for display to the designer.

To generate a community recommendation list, the recommendation engine searches a local community-frequency table to determine a set of recommended CAD commands that have been previously executed by another designer or a group of designers in the community after previously executing the particular CAD command. As with the user recommendation list, the one or more community recommendation lists are also transmitted to the CAD application for display to the designer.

Second, the resource module updates frequency information associated with the currently executed particular CAD command in a record within the local user-frequency table stored within the resource module. The frequency information associated with the particular CAD command indicates the number of times another specific CAD command is executed prior to the execution of the currently executed CAD command. Each record in the local user-frequency table stores frequency information indicating the number of times the execution of a given CAD command by the designer within the specific design context is preceded by the execution of another specific CAD command.

Finally, the resource module transmits the command use information to the central server for further processing. In turn, the central server generates frequency information associated with the currently executed CAD commands based on command use information received from the resource module. The generated frequency information is stored in a community-frequency table. Each record in the community-frequency table stores frequency information indicating the number of times the execution of a given CAD command is preceded by the execution of a different CAD command by a particular designer in the community within a specific design context. Frequency information stored in the community-frequency table is transmitted to the resource module for storage in the local community-frequency table.

One advantage of the disclosed technique is that the designer is informed of different recommended commands, such as CAD commands, in real-time via the recommendation lists generated by the resource module. The recommendation lists include recommended commands that have previously been executed by the designer, but more importantly, include recommended commands that have been executed by other designers in the community. Being informed of commands executed by other designers, keeps the designer aware of relevant commands that he/she may not have been aware of and therefore, allows the designer to perform workflows more effectively. Another advantage is that the central server stores and processes command use information from a community of designers. Only relevant frequency information is then transmitted to the individual instances of a software application, such as CAD application, executing within a network, which reduces the quantity of information that needs to be processed by the different endpoint machines in the network.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computing device. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for processing command use data received from a client computer to update frequency information in a frequency table stored in a community-frequency store, the method comprising:
   receiving from the client computer a first set of command use data associated with a first command executed within an application on the client computer, wherein the first set of command use data includes a design context associated with the session that reflects a particular workflow of actions or operations performed by the user when operating the application;
   storing the first set of command use data in a command use table included in a command-use database;
   identifying a second set of command use data stored in the command use table related to the first set of command use data and associated with a second command executed within the application prior to when the first command was executed within the application, wherein the second command comprises a command from an expert;
   determining a command execution sequence based on the first set of command use data and the second set of command use data that indicates the order in which the first command and the second command were executed within the application; and
   incrementing frequency information included in a first record within the frequency table that is associated with the first command based on the command execution sequence, wherein the frequency information indicates how many times the second command was executed within the application prior to when the first command was executed within the application.

2. The method of claim 1, further comprising the steps of:
   determining that the first record associated with the first command does not exist in the frequency table; and
   creating the first record in the frequency table.

3. The method of claim 1, further comprising the step of removing the first set of command use data and the second set of command use data from the command use table once the frequency information is incremented.

4. The method of claim 1, wherein the first set of command use data includes a command name associated with the command, a user identification associated with a user who executed the command, and a session identification associated with a session in which the command was executed.

5. The method of claim 4, wherein the step of identifying the second set of command use data includes searching the command use table for a record including the user identification and the session identification.

6. The method of claim 5, wherein the record further includes the design context.

7. The method of claim 1, further comprising the step of transmitting the frequency information included in the first record to one or more client computers.

8. The method of claim 1, wherein the first set of command use data has a first time stamp and the second set of command use data has a second time stamp.

9. The method of claim 8, wherein the step of determining the command execution sequence includes ordering the first command and the second command based on the first time stamp and the second time stamp.

10. The method of claim 1, wherein the design context reflects a number of vertices of a graphics model in the application.

11. The method of claim 1, wherein the design context reflects a number of faces of a graphics model in the application.

12. A non-transitory computer-readable storage medium storing instructions that, when executed by a processor, cause a computing system to process command use data received from a client computer and update frequency information in a frequency table stored in a community-frequency store, by performing the steps of:
   receiving from the client computer a first set of command use data associated with a first command executed within an application on the client computer, wherein the first set of command use data includes a design context associated with the session that reflects a particular workflow of actions or operations performed by the user when operating the application;
   storing the first set of command use data in a command use table included in a command-use database;
   identifying a second set of command use data stored in the command use table related to the first set of command use data and associated with a second command executed within the application prior to when the first command was executed within the application, wherein the second command comprises a command from an expert;
   determining a command execution sequence based on the first set of command use data and the second set of command use data that indicates the order in which the first command and the second command were executed within the application; and
   incrementing frequency information included in a first record within the frequency table that is associated with the first command based on the command execution sequence, wherein the frequency information indicates how many times the second command was executed within the application prior to when the first command was executed within the application.

13. The non-transitory computer-readable storage medium of claim 12, further comprising the steps of:
   determining that the first record associated with the first command does not exist in the frequency table; and
   creating the first record in the frequency table.

14. The non-transitory computer-readable storage medium of claim 12, further comprising the step of removing the first set of command use data and the second set of command use data from the command use table once the frequency information is incremented.

15. The non-transitory computer-readable storage medium of claim 12, wherein the first set of command use data includes a command name associated with the command, a user identification associated with a user who executed the command, a session identification associated with a session in which the command was executed, and a design context associated with the session that indicates a specific mode of the application.

16. The non-transitory computer-readable storage medium of claim 15, wherein the step of identifying the second set of command use data includes searching the command use table for a record including the user identification and the session identification.

17. The non-transitory computer-readable storage medium of claim 16, wherein the record further includes the design context.

18. The non-transitory computer-readable storage medium of claim 12, further comprising the step of transmitting the frequency information included in the first record to one or more client computers.

19. The non-transitory computer-readable storage medium of claim 12, wherein the first set of command use data has a first time stamp and the second set of command use data has a second time stamp.

20. The non-transitory computer-readable storage medium of claim 19, wherein the step of determining the command execution sequence includes ordering the first command and the second command based on the first time stamp and the second time stamp.

21. A computer system for processing command use data received from a client computer to update frequency information in a frequency table stored in a community-frequency store, the computer system comprising:
   a processor; and
   a memory storing instructions that when executed by the processor, cause the processor to:
      receive from the client computer a first set of command use data associated with a first command executed within an application on the client computer, wherein the first set of command use data includes a design context associated with the session that reflects a particular workflow of actions or operations performed by the user when operating the application,
      store the first set of command use data in a command use table included in a command-use database,
      identify a second set of command use data stored in the command use table related to the first set of command use data and associated with a second command executed within the application prior to when the first command was executed within the application, wherein the second command comprises a command from an expert,
      determine a command execution sequence based on the first set of command use data and the second set of command use data that indicates the order in which the first command and the second command were executed within the application, and
      increment frequency information included in a first record within the frequency table that is associated with the first command based on the command execution sequence, wherein the frequency information indicates how many times the second command was executed within the application prior to when the first command was executed within the application.

\* \* \* \* \*